(12) United States Patent
Bae et al.

(10) Patent No.: US 9,575,211 B2
(45) Date of Patent: Feb. 21, 2017

(54) FIXED SNOW MEASURING PLATE

(75) Inventors: Jin Young Bae, Namyangju-si (KR); Jae Won Jung, Seoul (KR); Seong Kyu Seo, Seoul (KR); Chul Kyu Lee, Seoul (KR); Young Jean Choi, Seoul (KR)

(73) Assignee: KOREA METEOROLOGICAL ADMINISTRATION, Seoul (KR)

( * ) Notice: Subject to any disclaimer, the term of this patent is extended or adjusted under 35 U.S.C. 154(b) by 228 days.

(21) Appl. No.: 14/240,468

(22) PCT Filed: Jul. 3, 2012

(86) PCT No.: PCT/KR2012/005283
§ 371 (c)(1),
(2), (4) Date: Feb. 24, 2014

(87) PCT Pub. No.: WO2013/027930
PCT Pub. Date: Feb. 28, 2013

(65) Prior Publication Data
US 2014/0208844 A1    Jul. 31, 2014

(30) Foreign Application Priority Data

Aug. 25, 2011  (KR) .................. 10-2011-0084905

(51) Int. Cl.
*G01W 1/14* (2006.01)

(52) U.S. Cl.
CPC ...................................... *G01W 1/14* (2013.01)

(58) Field of Classification Search
CPC ........................................................ G01W 1/14
See application file for complete search history.

(56) References Cited

U.S. PATENT DOCUMENTS

| 3,801,779 A | * | 4/1974 | Ver Sluis | H03K 17/945 250/222.1 |
| 6,508,349 B1 | * | 1/2003 | Lewin | G07F 17/248 194/350 |
| 2012/0272725 A1 | * | 11/2012 | Rasmussen | G01W 1/14 73/170.19 |

FOREIGN PATENT DOCUMENTS

| JP | 62-059879 U | | 4/1987 |
| JP | 03235086 A | * | 10/1991 |
| JP | 06-088881 A | | 3/1994 |
| JP | 06088881 A | * | 3/1994 |
| JP | 09-113636 A | | 5/1997 |
| JP | 10268068 A | * | 10/1998 |
| JP | 2003004865 A | * | 1/2003 |
| KR | 20-2011-0005922 U | | 6/2011 |

OTHER PUBLICATIONS

International Search Report dated Jan. 22, 2013 for Application No. PCT/KR2012/005283.
English Abstract for JP 62-059879.
English Abstract for JP 06-088881.
English Abstract for JP 09-113636.
English Abstract for KR20-2011-0005922.

* cited by examiner

*Primary Examiner* — Paul West
(74) *Attorney, Agent, or Firm* — Frost Brown Todd LLC

(57) ABSTRACT

There is provided a fixed snow measuring plate, the snow measuring plate that is fixed to the ground and is provided on the land to be disposed in a lower part of one end of an instrument tower in which a sensor for observing drifted snow is installed, wherein the snow measuring plate is installed such that a position thereof is fixed to the ground.

11 Claims, 4 Drawing Sheets

FIXED SNOW MEASURING PLATE

CROSS-REFERENCE TO RELATED APPLICATION

This application claims priority to Korean Patent Application No. 10-2011-0084905, filed on Aug. 25, 2011, in the Korean Intellectual Property Office, the entire contents of which are hereby incorporated by reference.

TECHNICAL FIELD

The present invention relates to a fixed snow measuring plate, and more specifically, to a fixed snow measuring plate which enables an accurate measurement of drifted snow to be performed by removing an error in measurement caused by rising and falling of the soil generated because the soil captures water when snow melts.

BACKGROUND ART

Drifted snow is a meteorological element constituting precipitation along with rainfall, and has been utilized as very important data for the planning on water utilization and flood control as well as meteorological analysis. In particular, the drifted snow has very high importance as a basic material in forecasting and analyzing snow melting that covers the greater part of a river outflow and a groundwater outflow.

There are various kinds of a snow-depth meter for measuring the drifted snow, such as ultrasonic waves, laser beams, images and the like. According to the principle of observation, a method of measuring the drifted snow is divided into an area measuring method using the amount of time that it takes the ultraviolet waves to be reflected to a snow surface and to return, a point measuring method using a light wave and a phase difference by irradiating laser beams, an image measuring method using an outside camera.

Meanwhile, according to guidelines of the World Meteorological Organization (WMO, 2008), the current level of snowdrift observation devices and technologies throughout the world is not superior to the accuracy of eye observation which is directly observed by a person.

The reason is because drifted snow is influenced by the wind, and thus a curvature is generated on a snow surface, or snow covered on a snow measuring plate is moved in any direction and thus it is difficult to obtain an average value. Also, the drifted snow falls down or is compacted due to the weight of snow, and freezes and melts repeatedly according to a temperature. This has a direct effect on the soil on which the snow measuring plate is installed, thereby causing rising and falling of the soil. Thus, due to the rising and falling of the soil, the standard point observed in the sensor is changed, and thus, it is difficult to obtain accurate observation data, and an error in observation resulting from it is frequently generated.

With regard to auto snow measuring apparatuses which have been currently operated at Korean meteorological observatories, an ultrasonic snow measuring apparatus has been installed at 72 observatories, and drift snow has been observed using CCTV (closed-circuit television), a snow-depth meter by laser and the like together. However, according to each of the observatories, the soil states of an observation field in which the snow measuring plate is installed are different from each other, and thus it is difficult to obtain accurate observation data because a standard point measured in the sensor is changed due to rising and falling of the soil of the lower part of the snow measuring plate generated when snow melts and is absorbed into the soil.

As illustrated in FIG. 1, an ultrasonic snow meter which has been currently used in the Meteorological Administration is configured such that an instrument tower 10 in which a sensor for observing drifted snow is installed, and a snow measuring plate 20 are separated from each other.

Since the instrument tower 10 is erected by laying concrete in a lower part of the soil, it is not almost influenced by rising and falling of the soil due to drifted snow or precipitation. On the contrary, the snow measuring plate 20 is installed by putting it on the ground directly or designating a certain section on the ground. This method is largely influenced by drifted snow and precipitation. That is, the soil of a lower part of the snow measuring plate 20 rises and falls repeatedly from several mm to several cm depending on a state of the soil when drifted snow melts and water flows into the soil. Accordingly, since the standard point observed in the sensor installed in the instrument tower 10 is changed, it is problematic in that it is difficult to obtain accurate observation data, and an error in observation resulting from it is frequently generated.

Meanwhile, FIG. 2 is a graph showing a height variation of a snow measuring plate generated when water flows into the soil based on observation data of a general snow-depth meter by laser. Specifically, a water screen was formed on the snow measuring plate due to light rain between 4:00 to 7:00 a.m. on Jun. 30, 2010, and accordingly, the error of an increase in a value observed by the snow-depth meter by laser was generated. However, from 7:00 a.m. when the rain stopped, a correction value was reduced to '0' again. Since then, from 7:00 am., a temperature increased, and thus, due to the water absorbed in the soil, the correction value was reduced from '0' to about '−2.5 mm.'

Furthermore, on Nov. 26, 2009, a temperature increased after the inflow of dense fogs from a thin mist from 3:00 a.m. to 11:00 a.m., and thus a correction value was reduced from '0' to about '−8 mm,' and since a value observed by an ultrasonic snow-depth meter is not expressed as a minus value, a variation in the snow measuring plate could not be confirmed.

Analyzing such a case, the soil influenced by precipitation or dense fogs causes rising of the soil due to water. This has an influence on a lower part of the soil on which the snow measuring plate is located, and a standard value, thereby causing an error in value of drifted snow observed practically.

DISCLOSURE OF INVENTION

Technical Problem

The present invention has been made keeping in mind the above problems occurring in the prior art, and an object of the present invention is to provide a fixed snow measuring plate that can continuously observe the amount of drifted snow without an error through long-lasting snowdrifts by fixedly installing a measurement plate in a base member buried in the ground.

The technical problem to be solved by the present invention is not limited to the technical problem mentioned above, and other technical problems which are not mentioned will be clearly by those having ordinary skill in the art to which the present invention pertains based on the following description.

Solution to Problem

In order to accomplish the above objects, the present invention provides a fixed snow measuring plate that is fixed to the ground and is provided on the land to be disposed in a lower part of one end of an instrument tower in which a sensor for observing drifted snow is installed, wherein the snow measuring plate is installed such that a position thereof is fixed to the ground.

Also, the snow measuring plate may include a base member installed to be buried in the ground; a plurality of supports fixed to an upper part of the base member; and a measurement plate connected to the support to be exposed to the land.

Also, the base member may be formed of a concrete structure.

Advantageous Effects of Invention

According to the present invention, it is advantageous in that a snow measuring plate is not influenced by rising and falling of the soil resulting from snowbreak generated due to an increase in temperature upon observing a weight of drifted snow and a growth of trees continuously so that a position of the snow measuring plate can be regularly maintained, and accordingly, the disadvantage of an error in observation due to the rising and falling of the soil can be supplemented, and the accurate observation of drifted snow can be carried out by maintaining a correction value.

MODE FOR THE INVENTION

Figure 1:
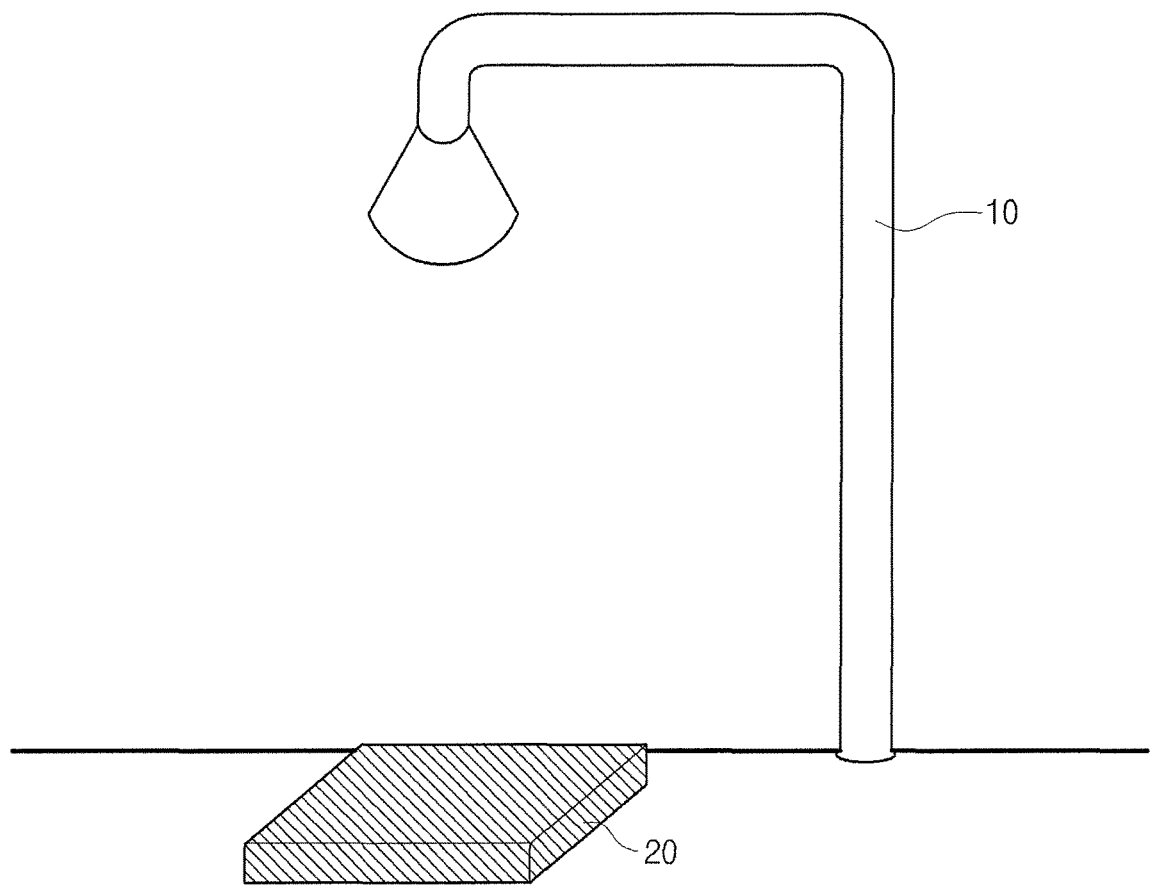
FIG. 1 is a side view schematically showing a general ultrasonic snow-depth meter.
Figure 2:
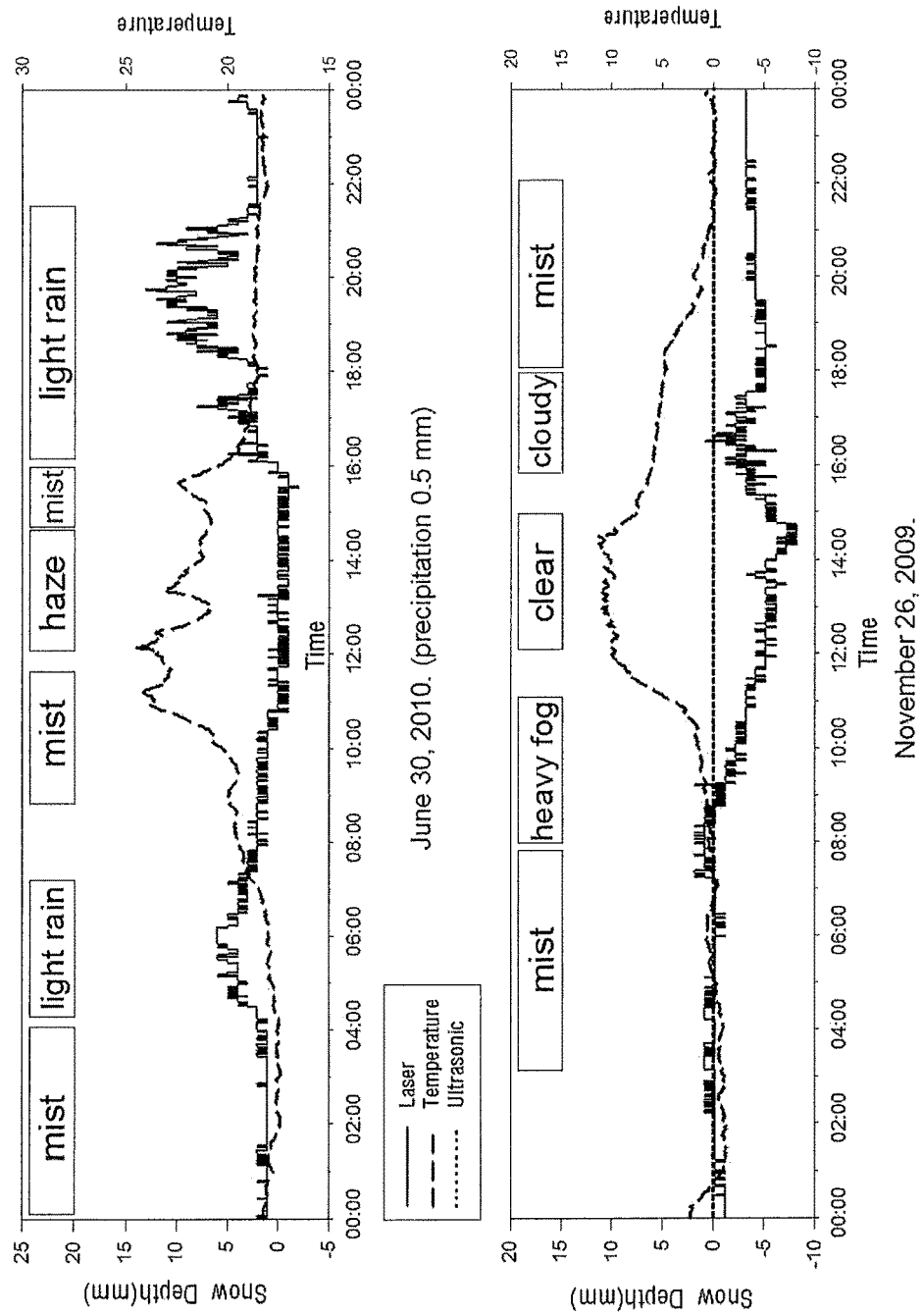
FIG. 2 is a graph showing a height variation of a snow measuring plate generated when water flows into the soil based on observation data of a general snow-depth meter by laser.

Hereinafter, embodiments according to the present invention will now be described more fully with reference to the accompanying drawings. In the drawings, the size or shape of elements and the like may be exaggerated for clarity and convenience's sake. The terminologies specially defined in the description in consideration of configurations and operations of the present invention may be changed according to a user, the intention of an operator or a practice. These terminologies should be defined based on the contents throughout the specification. Furthermore, technical ideas of the present invention should not be construed as limited to the embodiments set forth herein. The embodiments of the present invention may be easily embodied in many different forms by those having ordinary skill in the art who understand the present invention within the scope of the same technical idea. Of course, these embodiments fall also within the scope of the present invention.

Figure 3:
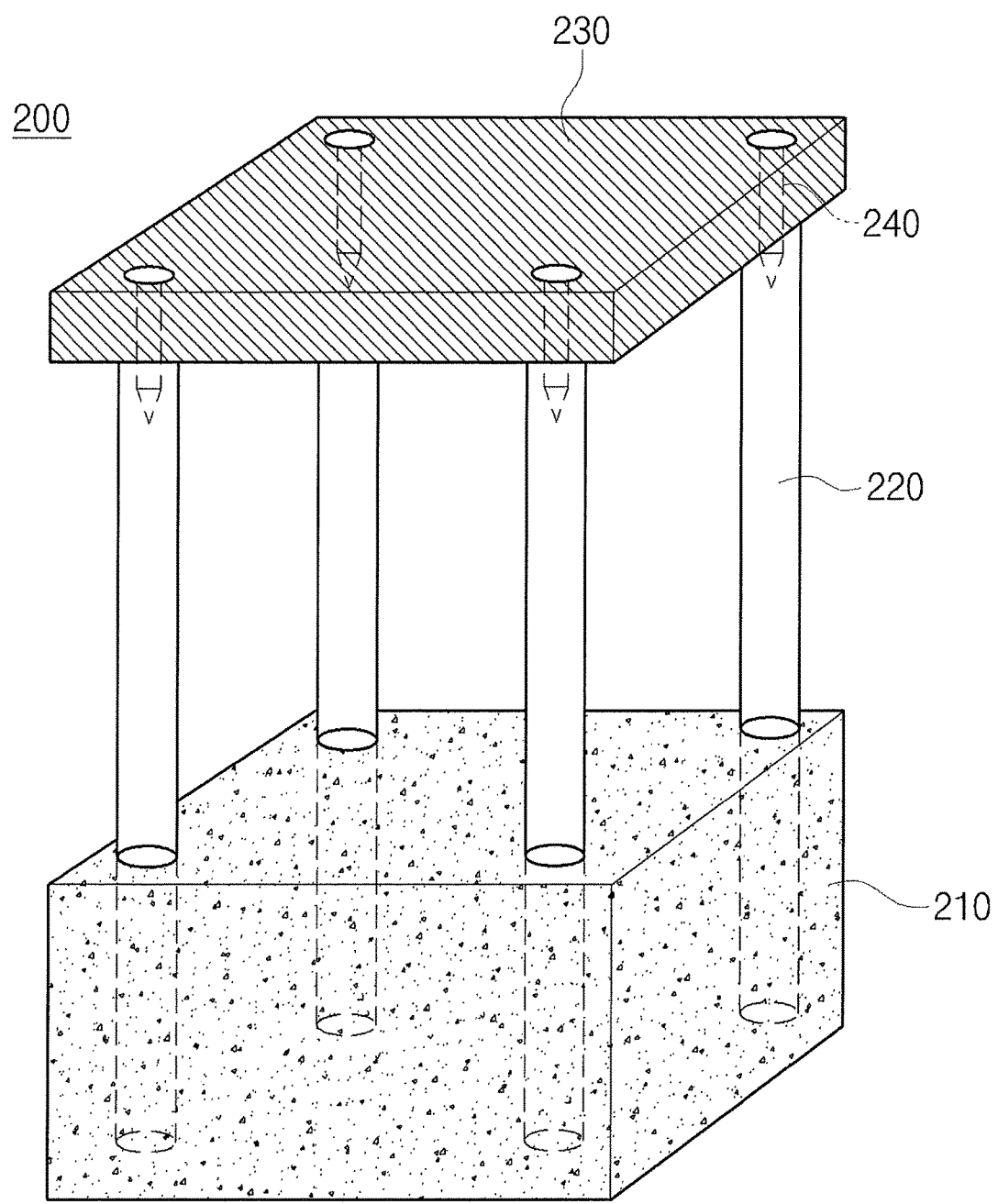
FIG. 3 is a perspective view showing a fixed snow measuring plate according to one embodiment of the present invention.
Figure 4:
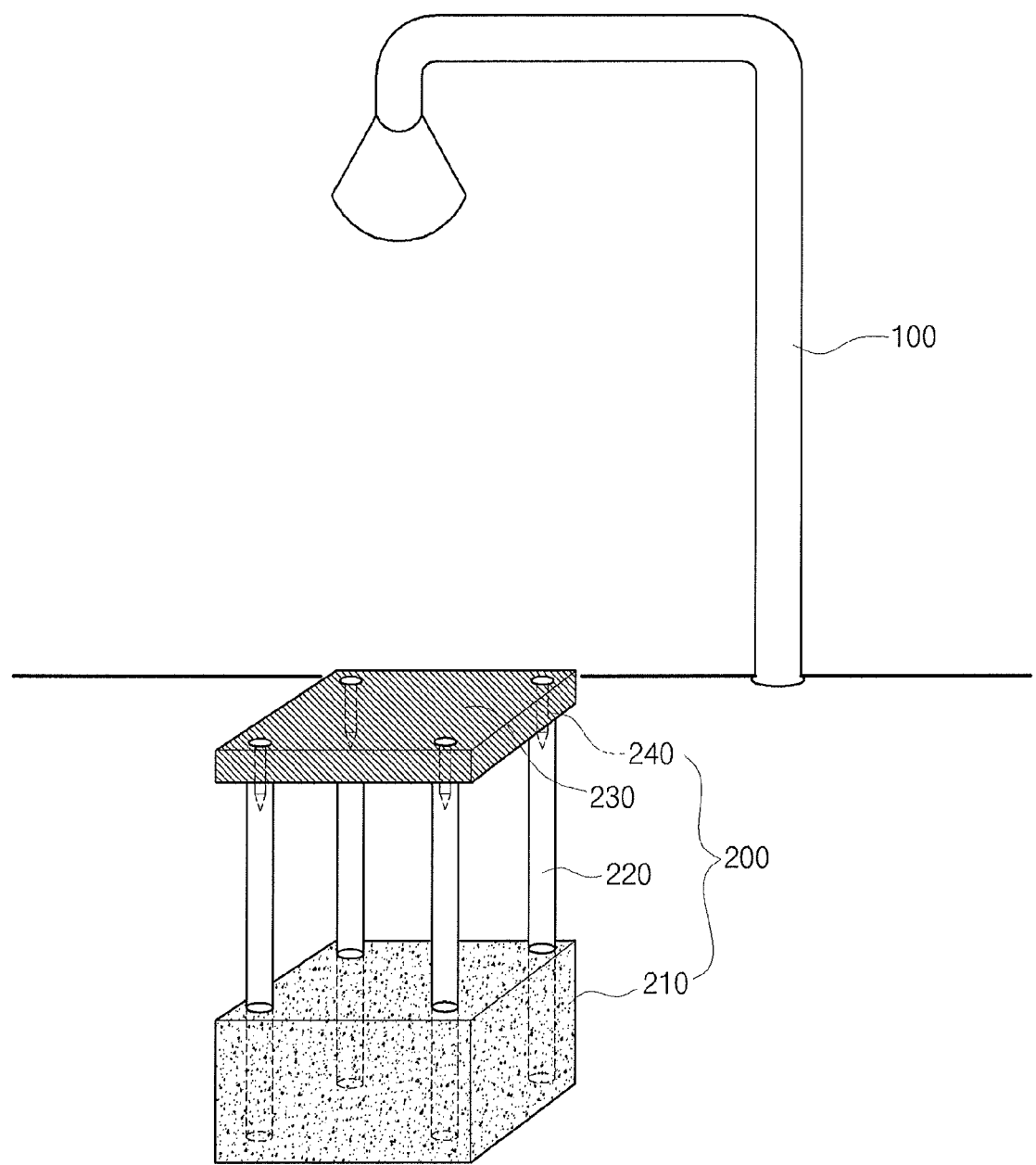
FIG. 4 is a side view schematically showing a state in which the fixed snow measuring plate of a snow-depth meter according to the one embodiment of the present invention is penetrated in the ground.

FIG. 3 is a perspective view showing a fixed snow measuring plate according to one embodiment of the present invention, and FIG. 4 is a side view schematically showing a state in which the fixed snow measuring plate of a snow-depth meter according to the one embodiment of the present invention is penetrated in the ground. The detailed structure of a fixed snow measuring plate of the snow-depth meter will be described in detail with reference to FIGS. 3 and 4.

The snow-depth meter includes an instrument tower 100 and a snow measuring plate 200. The instrument tower 100 is fixed to the ground, and a sensor (not drawn) for observing snowdrifts is installed in one end thereof. The sensor is intended to measure a snowdrift value by sensing ultrasonic waves, laser beams and the like, and is an element according to a conventional art. The detailed description thereon will be omitted.

Meanwhile, in addition to the aforesaid element, a solar battery for self-supplying a power source, a radio wire communication device for telecommunication, a memory storage in which a value of deposited snow is recorded, and the like may be installed in the instrument tower 100. However, this could be selectively embodied by those having ordinary skill in the art to which the present invention pertains according to the need, and accordingly, a detailed limitation thereon of claims is not performed.

The snow measuring plate 200 is provided on the ground to be disposed in a lower part of one end of the instrument tower 100. Accordingly, the sensor installed in the instrument tower 100 may sense the amount of snow deposited in the snow measuring plate 200.

Meanwhile, when drifted snow piles up beyond a constant level, the drifted snow falls down or is compacted due to the weight of snow, and freezes and melts repeatedly according to a temperature, thereby directly having an effect on the soil on which a measurement plate 230 is installed. Thus, since a standard point measured in the sensor is changed due to rising and falling of the soil, it is difficult to obtain accurate measurement data, and accordingly, an error in measurement is frequently generated. Accordingly, the snow measuring plate 200 is installed such that a position thereof is fixed to the ground.

Specifically, the snow measuring plate 200 include a base member 210, a plurality of supports 220, and a measurement plate 230. The base member 210 is installed to be buried in the ground and is made of a concrete structure so that the base member can have a sufficient weight to prevent an installation position of the snow measuring plate from being influenced by rising and falling of the soil resulting from snowbreak generated due to an increase in temperature upon observing a weight of drifted snow and a growth of trees continuously.

The plurality of supports 220 are fixed to an upper part of the base member 210. As illustrated in FIG. 3, the supports 220 may be provided such that four supports are disposed at respective edges of the base member 210, but when the measurement plate 230 is stably fixed to the base member 210, the supports 220, such as three supports or five supports may be provided regardless of the number thereof. The contents of the present invention are not limited to the number of the supports 220.

Furthermore, like the base member 210, since the supports 220 are also buried in the ground, it is preferable that the supports be made of a stainless material in order to prevent the supports from be damaged by corrosion.

The measurement plate 230 is connected to an upper end of the supports 200 to be exposed to the ground, and it is preferable that the measurement plate 230 be coupled by a coupling member 240, such as a fixing bolt so as to be stably fixed to the supports 220.

As such, according to the snow measuring plate, because the measurement plate 230 is fixedly installed in the base member 210 buried in the ground, the amount of drifted snow may be continuously observed without an error through long-lasting snowdrifts The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

The invention claimed is:

1. A fixed snow measuring plate assembly, wherein the snow measuring plate assembly comprises:
   (a) a base member buried in the ground such that the base member is below ground level, wherein the base member is in a position fixed relative to ground level such that the base member is configured to prevent movement from the position due to rising or falling of soil;
   (b) a snow measuring plate fixed relative to the base member, wherein the snow measuring plate is configured to be read by a sensor for observing drifted snow; and
   (c) a plurality of support members extending within the ground and fixed to both the base member and the snow measuring plate such that the snow measuring plate is secured to the base member via the support members;
   wherein the snow measuring plate is installed such that a position thereof is fixed to the ground and such that the snow measuring plate is located at ground level.

2. The snow measuring plate of claim 1, wherein the plurality of supports are fixed to an upper part of the base member; and the snow measuring plate is exposed to the land.

3. The snow measuring plate of claim 2, wherein the base member is made of a concrete structure.

4. The fixed snow measuring plate of claim 2, wherein the plurality of supports are made of a stainless material.

5. A fixed snow measuring plate comprising:
   (a) a measuring plate, wherein the measuring plate is fixed to the ground, wherein the measuring plate is configured to be read by a sensor for observing drifted snow;
   (b) a base member, wherein the base member is buried in the ground below ground level, wherein the base member is configured to prevent movement of the base member in response to rising and falling of soil; and
   (c) a plurality of supports extending through the ground and connecting the measuring plate with the base member, wherein the plurality of supports are configured to fix the measuring plate relative to the base member.

6. The fixed snow measuring plate of claim 5, wherein a weight of the base member is configured to prevent movement of the base member in response to rising and falling of soil.

7. The fixed snow measuring plate of claim 5, wherein the base member is buried at a depth configured to prevent movement of the base member in response to rising and falling of soil.

8. The fixed snow measuring plate of claim 5, wherein an end of the plurality of supports are exposed to the ground.

9. The fixed snow measuring plate of claim 5, wherein the measuring plate and the plurality of supports are fixed with a coupling member.

10. The fixed snow measuring plate of claim 9, wherein the coupling member comprises a fixing bolt.

11. A fixed snow measuring plate comprising:
    (a) a measuring plate, wherein the measuring plate is fixed to the ground, wherein the measuring plate is configured to be read by a sensor for observing drifted snow;
    (b) a base member, wherein the base member is installed to be buried in the ground, wherein the base member is configured to prevent movement of the base member in response to rising and falling of soil; and
    (c) a plurality of support members extending within the ground, wherein the plurality of support members connect the base member with the measuring plate, wherein the plurality of support members are unitarily connected to both the base member and the measuring plate such that the measuring plate may not move relative to the base member.

* * * * *